US012657475B2

(12) United States Patent
Shae et al.

(10) Patent No.: US 12,657,475 B2
(45) Date of Patent: Jun. 16, 2026

(54) COMPUTER IMPLEMENTED MULTI-LAYER FEDERATED LEARNING METHOD BASED ON DISTRIBUTED CLUSTERING AND NON-TRANSITORY COMPUTER READABLE MEDIUM THEREOF

(71) Applicant: ASIA UNIVERSITY, Taichung City (TW)

(72) Inventors: Zon-Yin Shae, Taipei City (TW); Kun-Yi Chen, Taichung City (TW); Jing-Pha Tsai, Taichung City (TW); Chi-Yu Chang, Taichung City (TW); Yuan-Yu Tsai, Taichung City (TW)

(73) Assignee: ASIA UNIVERSITY, Taichung City (TW)

( * ) Notice: Subject to any disclaimer, the term of this patent is extended or adjusted under 35 U.S.C. 154(b) by 540 days.

(21) Appl. No.: 18/361,888

(22) Filed: Jul. 30, 2023

(65) Prior Publication Data

US 2024/0054352 A1 Feb. 15, 2024

(30) Foreign Application Priority Data

Aug. 11, 2022 (TW) .................................. 111130223

(51) Int. Cl.
*G06N 3/098* (2023.01)
(52) U.S. Cl.
CPC .................................... *G06N 3/098* (2023.01)
(58) Field of Classification Search
None
See application file for complete search history.

(56) References Cited

U.S. PATENT DOCUMENTS

| | | | | |
|---|---|---|---|---|
| 11,494,700 B2 * | 11/2022 | Pastore | ................. | G06N 3/098 |
| 11,861,418 B2 * | 1/2024 | Walters | .................. | G06F 9/541 |
| 11,982,993 B2 * | 5/2024 | Cella | .................. | G05B 19/4155 |
| 12,412,120 B2 * | 9/2025 | Cella | ...................... | G06N 20/00 |
| 2013/0006991 A1 * | 1/2013 | Nagano | ................... | G06F 16/41 |
| | | | | 707/E17.046 |
| 2021/0089878 A1 * | 3/2021 | Greenewald | ......... | G06N 3/0495 |
| 2021/0312336 A1 * | 10/2021 | Sinn | ....................... | G06N 3/084 |
| 2021/0374617 A1 * | 12/2021 | Chu | ....................... | G06N 3/084 |
| 2022/0083904 A1 * | 3/2022 | Pastore | ................. | G06N 3/045 |
| 2023/0153177 A1 * | 5/2023 | Walters | .................. | G06F 9/541 |
| | | | | 382/225 |

* cited by examiner

*Primary Examiner* — Hasanul Mobin
(74) *Attorney, Agent, or Firm* — Apex Juris, pllc; Cera Oh

(57) ABSTRACT

A multi-layer federated learning method based on distributed clustering is provided, which comprises the following steps. Computing a feature distribution similarity for each of participating nodes with non-(non-independent and identically distributed) data sets, and grouping these nodes into plural clusters by the feature distribution similarity. Updating local model of nodes of each cluster by a federated learning algorithm, and inputting these nodes into a multi-layer aggregation mechanism. Terminating the operation of the multi-layer aggregation mechanism until the clustering result meets a required demand. Furthermore, we implement a blockchain-based multi-layer federated learning system, including model aggregation module, API module, time-series synchronization module, and IPFS, based on distributed clustering architecture. The learning performance is proven to effectively improved.

10 Claims, 7 Drawing Sheets

600

COMPUTER IMPLEMENTED MULTI-LAYER FEDERATED LEARNING METHOD BASED ON DISTRIBUTED CLUSTERING AND NON-TRANSITORY COMPUTER READABLE MEDIUM THEREOF

CROSS-REFERENCE TO RELATED APPLICATION

This application claims the benefit of Taiwan Patent Application No. 111130223, filed on Aug. 11, 2022, in the Taiwan Intellectual Property Office, the disclosure of which is incorporated herein in its entirety by reference.

BACKGROUND OF THE INVENTION

1. Field of the Invention

The present invention relates to a computer implemented federated learning method, and more particularly, to a multi-layer federated learning method based on distributed clustering by using blockchain technology.

2. Description of the Related Art

The conventional federated learning system uses a centralized server to aggregate global models. The known aggregation method includes local data augmentation, global data sharing, local fine-tuning, user-defined layers, client clusters, or the like. However, since none of the above methods consider the degree of quantification of feature distribution similarity, federated learning performance may be severely degraded. There is no effective method to quantify the feature distribution similarity of each participating node data.

According to the related art, when an artificial intelligence model is trained through a dataset and then tested using another dataset, it may be difficult to predict the accuracy of the model. The present invention quantifies the feature distribution similarity of two non-independent and identically distributed datasets, so that the robustness of the learning model can be predicted in advance and improved effectively.

Therefore, the inventor of the present invention has considered and designed the distributed clustering-based multi-layer federation learning method, so that the deficiencies of the related art can be improved, and the industrial applicability can be increased.

SUMMARY OF THE INVENTION

To this end, the present invention provides a distributed clustering-based multi-layer federated learning method including the following steps: calculating feature distribution similarity of each of a plurality of non-independent and identically distributed (non-IID) data nodes; grouping the non-IID data nodes into an aggregation model including a plurality of clusters based on the feature distribution similarity; updating a local model of the non-IID data node within the aggregate model by using a federated learning algorithm; and inputting the aggregation model into an aggregation method of a multi-layer model. The aggregation method of the multi-layer model includes the following Steps a to d. Step a: Setting the number of layers of the aggregation model to i, in which i has a value of 1. Step b: Aggregating the clusters in i-th layers and outputting a grouping result. Step c: Outputting the multi-layered model when the grouping result achieves model performance and stopping execution. Step d: When the grouping result does not achieve the model performance, accumulating 1 in i, inputting the grouping result to the i-th layer, and executing step b again.

Preferably, the feature distribution similarity may include a feature quantity of each of the non-IID data nodes, in which the feature quantity may be a quantity of features having a significant difference between data to data distribution difference statistical test analysis, or a quantity of features having significant correlation within each data to correlation statistical test analysis.

Preferably, the feature distribution similarity may include a feature effect value (denoted as the Effect Size), obtained from statistical test operations on above-mentioned quantity of features having a significant difference between data or the quantity of features having significant correlation within each data.

Preferably, the feature quantity may be obtained using statistically significant p-values.

Preferably, the feature effect value may include a mean value, a standard deviation, or a sample number.

Preferably, through the feature distribution similarity, the non-IID data nodes may be grouped into a plurality of clusters according to unsupervised learning.

Preferably, the unsupervised learning may include K-means, Expectation-Maximization Algorithm, Gaussian Mixture Model, or Bayesian Gaussian Mixture Model.

Preferably, the non-IID data nodes in each cluster may have similar feature distribution similarity.

Preferably, the federated learning algorithm may set each cluster as a unit and update a local model of the non-IID data node in each cluster.

Preferably, the achieving of the model performance signifies including the case of aggregating all clusters into global clusters.

Preferably, the aggregation method of the multi-layer model may be supported and implemented by a blockchain network technology. The present invention proves that the effectiveness of federated learning can be improved according to the feature distribution similarity of each data node, through the integration of a model aggregation module, an API module, a timing synchronization module and an interplanetary file system.

As can be seen from the above description, the distributed clustering-based multi-layer federation learning method proposed in the present invention can achieve the following two advantages:

(1) According to the present invention, without using the original data on each data node, the feature similarity of the data can be quantified only by using its corresponding statistical value. In addition, based on the quantified value, the distributed clustering-based multi-layer federation learning method can be additionally designed.

(2) The overall distributed characteristics learned with the novel federated learning structure can be implemented through blockchain, and accordingly, data privacy and security can be further strengthened.

DETAILED DESCRIPTION OF THE INVENTION

In order to understand technical features, contents, advantages and effects implemented thereby according to the present invention, the present invention will be described in detail as follows using the representation form of the embodiment with reference to the drawings. The drawings used herein are only intended to supplement the specification as a gist, and may not correspond to the actual proportions and exact arrangements after implementation of the present invention. Therefore, the drawings do not limit the scope of the claims to be actually implemented by the present invention upon interpretation related to the configuration and arrangement of the accompanying drawings.

Advantages, features and technical solutions to be achieved according to the present invention will be more easily understood by describing in more detail the accompanying drawings and the embodiments as reference examples. Further, the present invention may be implemented in various forms and will not be construed as being limited only to the embodiments described herein. For those skilled in the art, the disclosure will be more fully understood and the scope of the present invention will be fully conveyed through the provided embodiments. Further, the present invention will be subject to the following claims.

Figure 1:
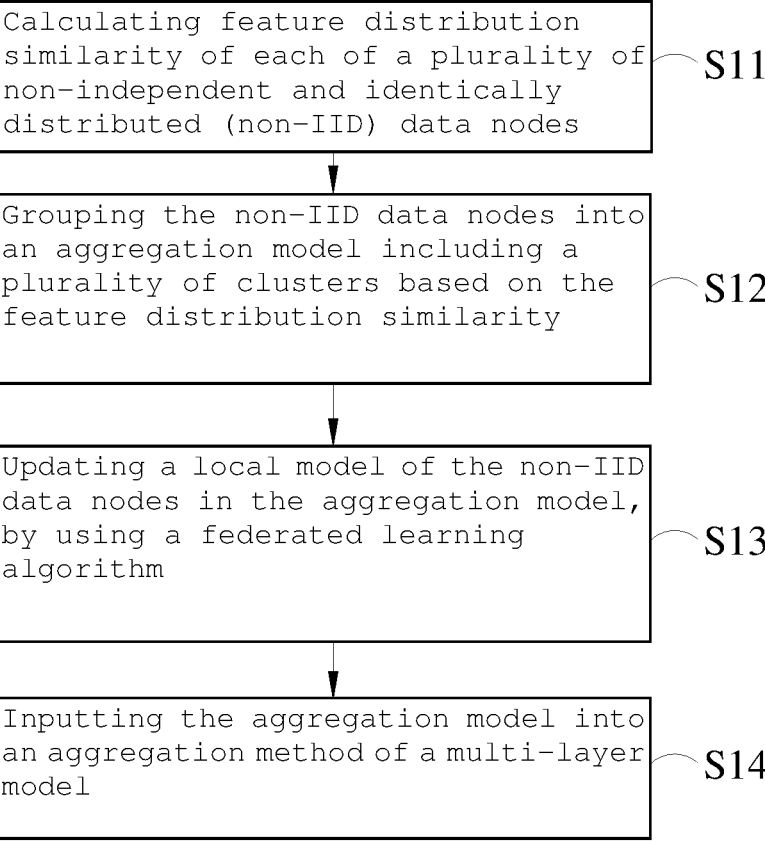
FIG. 1 is a first flow chart of a distributed clustering-based multi-layer federated learning method according to the embodiment of the present invention.
Figure 2:
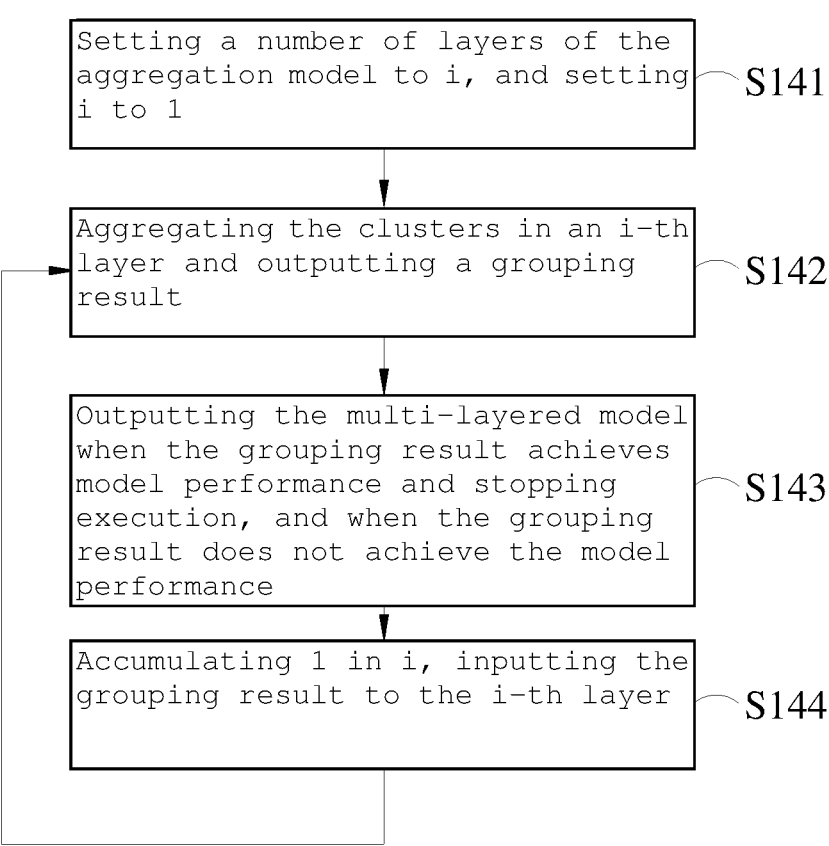
FIG. 2 is a second flow chart of the distributed clustering-based multi-layer federated learning method according to the embodiment of the present invention.

FIGS. 1 and 2 are first and second flow charts of the distributed clustering-based multi-layer federated learning method according to the embodiment of the present invention. As shown in the drawings, the embodiment proposes the distributed clustering-based multi-layer federation learning method, and includes the following steps S11 to S14.

In step S11, feature distribution similarity of each non-IID data node is calculated.

In the embodiment, the feature distribution similarity in step S11 may include a feature quantity and a feature effect value within each non-IID data node. The feature quantity may be a feature quantity with significant differences between data, or may be a feature quantity with significant correlation within each data. In addition, the feature effect value may include a mean value, a standard deviation, or a sample number of the feature.

In step S12, the non-IID data nodes are grouped according to the feature distribution similarity into an aggregation model including a plurality of clusters, in which the grouping of non-IID data nodes into different clusters may perform by grouping according to a distance equation, or may perform by usual unsupervised learning using schemes such as K-means, Expectation-Maximization Algorithm, Gaussian Mixture Model, or Bayesian Gaussian Mixture Model.

Particularly, after all non-IID data nodes are grouped through step S12, non-IID data nodes in each cluster have relatively similar feature distribution similarity.

In step S13, a local model of the non-IID data node may be updated in the aggregation model by using a federated learning algorithm to allow the non-IID data nodes in each cluster to exhibit a smooth distribution with non-IID differences, through similar characteristics between data in each cluster.

In step S14, the aggregation model is input to the aggregation method of the multi-layer model.

More specifically, referring to FIG. 2, in step S14, the aggregation method of the multi-layer model may further include the following sub-steps S141 to S144. This is as follows.

In step S141, the number of layers of the aggregation model is set to i, and i is set to 1.

In step S142, the clusters in the i-th layer are aggregated and a grouping result is output.

In step S143, when the grouping result achieves model performance, the multi-layer model is output and execution is stopped. When the model performance cannot be achieved, step S144 is performed. The model performance indicates when the clustering results are aggregated into global clusters and when it is impossible to re-aggregate another new result.

In step S144, 1 is accumulated in i, the grouping result is input to the i-th layer, and step S142 is performed again.

Figure 3A:
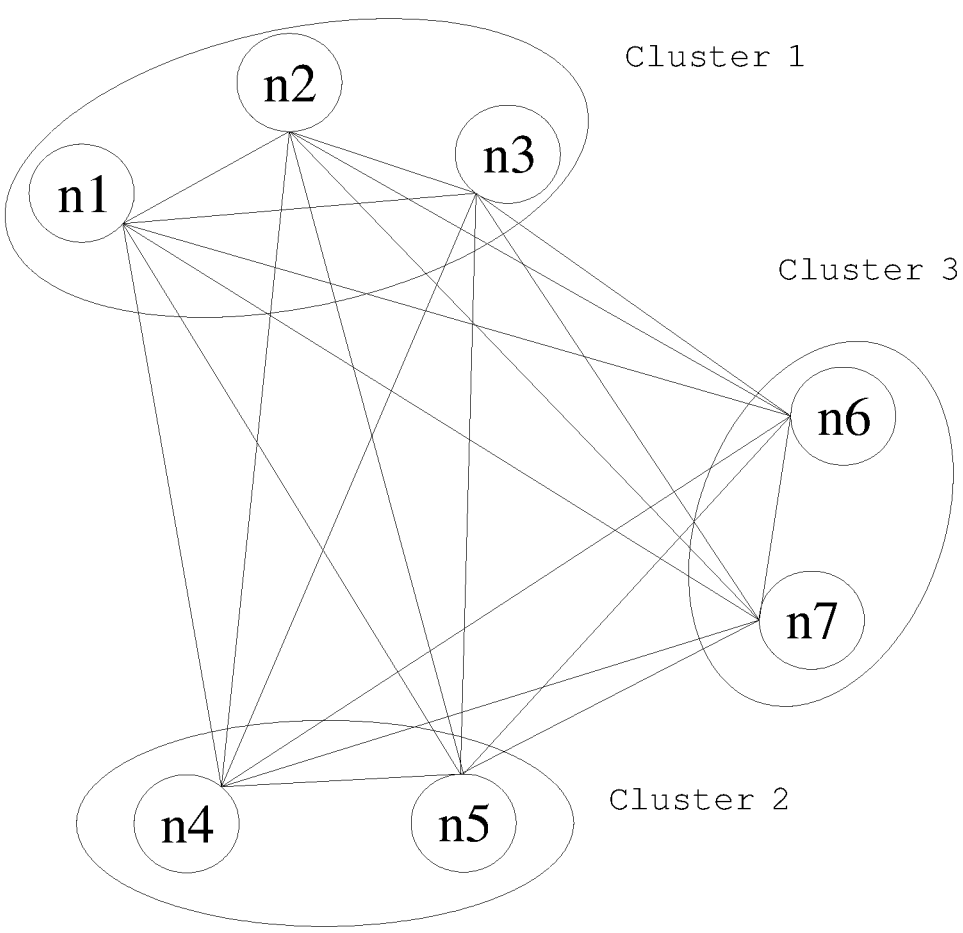
FIG. 3A is a schematic diagram showing grouping of the distributed clustering-based multi-layer federated learning method according to the embodiment of the present invention.
Figure 3B:
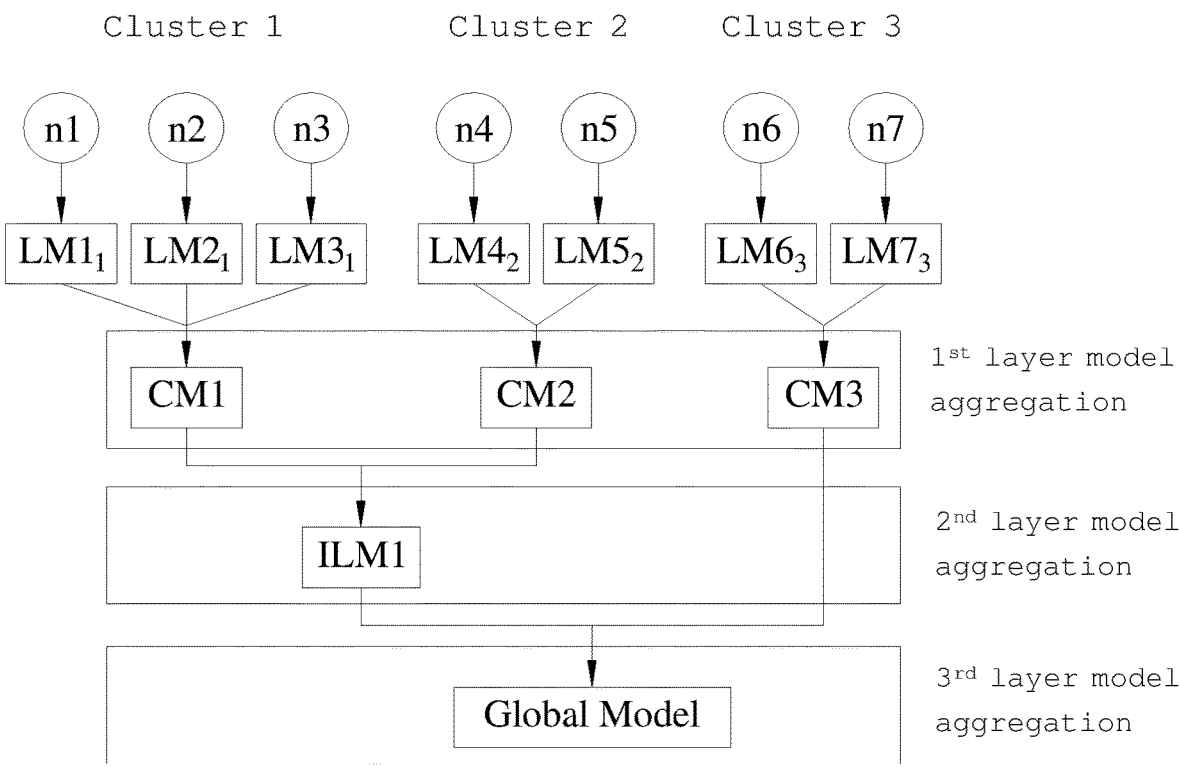
FIG. 3B is a schematic diagram of the distributed clustering-based multi-layer federated learning according to the embodiment of the present invention.

FIGS. 3A and 3B are a cluster schematic diagram of the distributed clustering-based multi-layer federated learning method and a schematic diagram of the multi-layer federated learning according to the embodiments of the present invention. As shown in FIG. 3A, n1 to n7 represent non-IID data nodes. In the related art, the seven nodes may be connected in series to perform the multi-layer federated mechanism, and the serial connection refers to a scheme of connecting nodes in a straight line as shown in the drawing. Unlike the related art, the present invention groups the seven non-IID data nodes first, and the grouping is performed based on the feature distribution similarity within nodes therebetween. When the degree of similarity of two processing data nodes is high, they can be grouped into the same cluster. Since the feature distribution similarity and the grouping have been described in the above embodiments, detailed description will be omitted.

In the embodiment, through similar feature distribution similarity, n1 to n7 may be grouped into three clusters, that is, cluster 1{n1,n2,n3}, cluster 2{n4,n5}, and cluster 3{n6, n7}. In addition, the three clusters may be additionally input back to the multi-layer model, and the corresponding schematic is shown in FIG. 3B. $LM1_1$ represents a local model in a first non-IID data node in cluster 1. Uppercase letter 1 represents a node index, lowercase letter 1 represents a cluster index, CM1 represents a clustering model within cluster 1, and ILM1 represents an inner-layer model.

In the embodiment, each non-IID data node may further update the internal local model (e.g., $LM1_1$, $LM2_1$, . . . , and $LM7_3$ in the drawing) based on the cluster's dissimilarity, and input to the first layer model aggregation of the multi-layer model in a unit of cluster, after the update is completed. In addition, in the embodiment, CM1 is aggregated with CM2 and output as a second layer model aggregation, thereby forming ILM1. Thereafter, the ILM1 is aggregated with CM3 and output as a third layer model, thereby forming a global model. Because the aggregation cannot be performed with other clusters, at this point, the global model is output and the operation is stopped according to the multi-layer model aggregation method.

However, the above-described embodiment is illustratively implemented with three layers, however, the present invention is not limited thereto. The multi-layer model may determine the number of layers based on the number of clusters and the actual aggregation situation. Each non-IID data node may contain various data samples, such as population data, agricultural product data, or different types of 3C product data in various countries or regions. Thereafter, grouping is performed according to the feature distribution similarity, and the multi-layer federation learning is performed using the grouping result.

Particularly, according to the present invention, the aggregation method of the multi-layer model may be supported and implemented by the blockchain network technology. The consensus mechanism on the blockchain and forgery-proof characteristics thereof may be used, so that both data privacy and security can be additionally considered. In addition, as described above, the local model may be updated in consideration of the degree of quantification of non-IID, so that degradation of the non-IID data may be prevented during federated learning.

Figure 4:
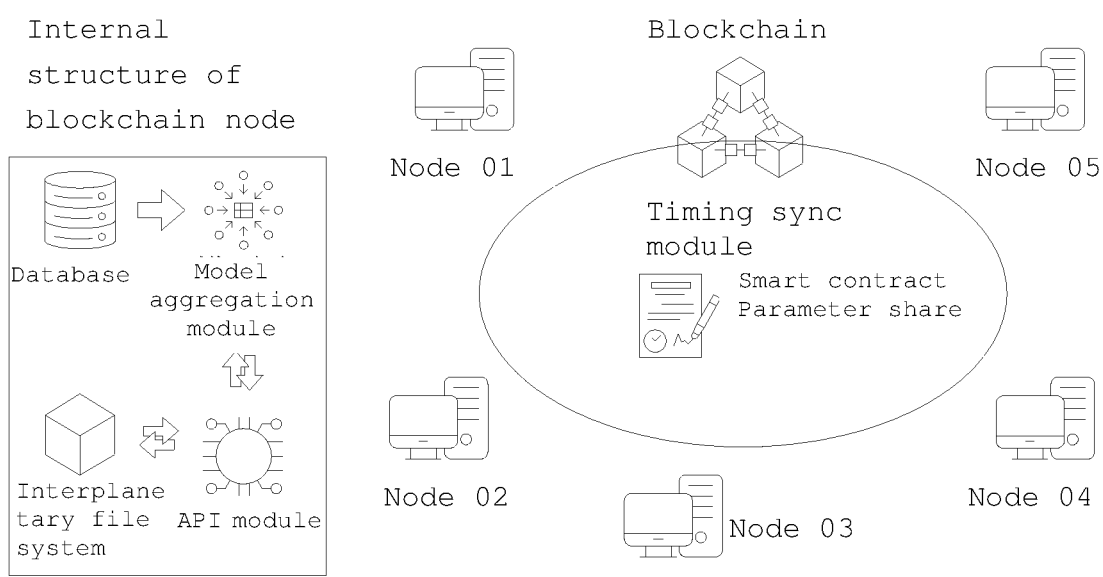
FIG. 4 is a system structure and essential modules when using blockchain technology according to the embodiment of the present invention.

FIG. 4 is a system structure and essential modules when using blockchain technology according to the embodiment of the present invention. As shown in the drawings, the blockchain network technology may be implemented through the model aggregation module, the API module, the timing synchronization module, and the interplanetary file system (IPFS). The model aggregation module is used for model training and model merging. The API module is configured to network communicate with the timing synchronization module, the model aggregation module, and the IPFS. The timing synchronization module includes a smart contract and records a hash value stored by each node model parameter.

The federated learning structure is required to first calculate the feature distribution similarity in each model aggregation module of the blockchain node. The corresponding value is transmitted to the timing synchronization module through the API module. The timing synchronization module groups blockchain nodes using feature similarity, and starts to update the local model and the aggregation model via the federated learning algorithm. The transmission of subsequent model parameters is obtained from the model aggregation module via the API module. After uploading to the IPFS, a returned hash value is stored in the timing synchronization module, and other nodes also obtain hash values from the timing synchronization module through the API module. Model parameters are downloaded from the IPFS, the model parameters are transmitted to the model aggregation module, and the above steps are continuously repeated until the model aggregation is completed, thereby outputting the global model.

Figure 5:
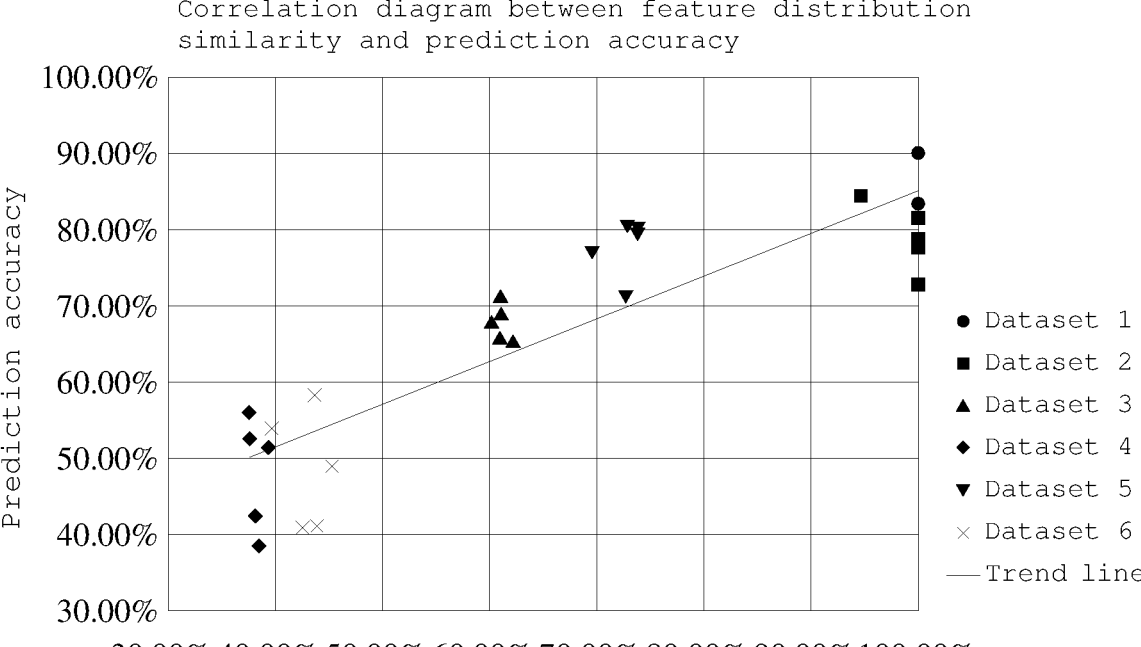
FIG. 5 is an example in which the system according to the embodiment of the present invention is applied to different test datasets.

FIG. 5 is an example of a correlation between the feature distribution similarity obtained through the present invention and the test accuracy. The drawing shows five types of datasets indicated by different symbols. For example, dataset 1 is trained as an artificial intelligence model, and the trained dataset is directly applied to the remaining 5 datasets to observe the test accuracy. As shown in the drawings, there is a clear linear relationship between the feature distribution similarity obtained through the present technology and the accuracy. When two datasets have a higher feature similarity value (closer to 1), the artificial intelligence model has better performance in the corresponding dataset.

Figure 6:
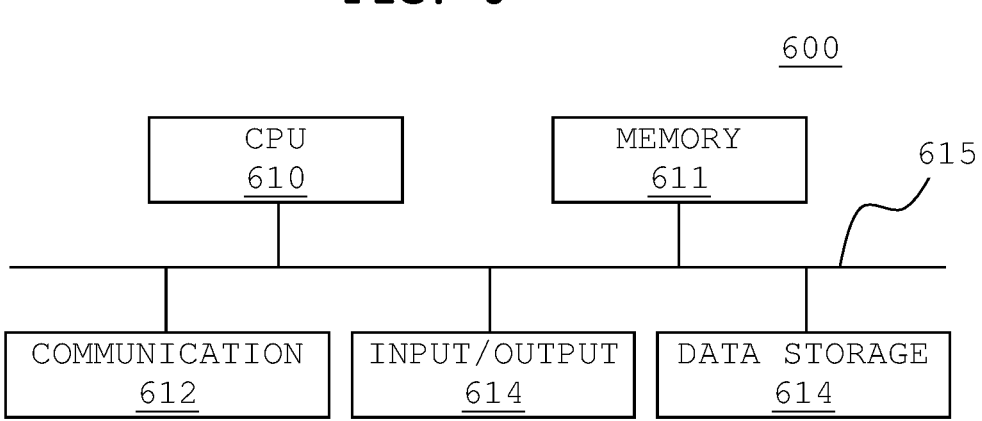
FIG. 6 is a block diagram illustrating a machine able to read computer codes from a computer-readable medium and perform any of the methodologies discussed herein, according to an example embodiment.

FIG. 6 is a block diagram illustrating components of a machine able to read instructions from a machine-readable medium and perform any of the methodologies discussed herein, according to an example embodiment.

The shown processing system 600 includes one or more processors, including a CPU 610, one or more memories 611 (at least a portion of which may be used as working memory, e.g., random access memory (RAM)), one or more data communication device(s) 612, one or more input/output (I/O) devices 613, and one or more data storage devices 614, all coupled to each other through an interconnect 615. The interconnect 615 may be or include one or more conductive traces, buses, point-to-point connections, controllers, adapters and/or other conventional connection devices. Each processor 610 controls part of the operation of the processing system 600 and can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Each memory 611 can be or include one or more physical storage devices, which may be in the form of RAM, read-only memory (ROM) (which may be erasable and programmable), flash memory, miniature hard disk drive, or other suitable type of storage device, or a combination of such devices. Each data storage device 614 can be or include one or more hard drives, digital versatile disks (DVDs), flash memories, or the like. Each memory 611 and/or data storage 614 can store (individually or collectively) data and instructions that configure the processor(s) 610 to execute operations to implement the techniques described above. Each communication device 612 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing system 600, each I/O device 613 can be or include a device such as a display (which may include a transparent AR display surface), audio speaker, keyboard, mouse or other pointing device, microphone, camera, etc. Note, however, that such I/O devices may be unnecessary if the processing system 600 is embodied solely as a server computer.

In the case of a user device, a communication device 612 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, a communication device 612 can be or include, for example, any of the aforementioned types of communication devices, a wired Ethernet adapter, cable modem, DSL modem, or the like, or a combination of such devices.

Unless contrary to physical possibility, it is envisioned that (i) the methods/operations described herein may be performed in any sequence and/or in any combination, and that (ii) the components of respective embodiments may be combined in any manner.

The machine-implemented operations described above can be implemented by programmable circuitry programmed/configured by software and/or firmware, or entirely by special-purpose ("hardwired") circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the techniques introduced here may be stored on a computer-readable storage medium and may be executed by one or more general-purpose or special-purpose programmable microprocessors. A "computer-readable medium", as the term is used herein, includes any mechanism that can tangibly store information in a non-transitory form accessible by a machine (a machine may be, for example, a computer, network device, cellular phone, personal digital assistant (PDA), manufacturing tool, any device with one or more processors, etc.). For example, a computer-readable medium includes recordable/non-recordable media (e.g., RAM or ROM; magnetic disk storage media; optical storage media; flash memory devices; etc.), etc.

The above-described embodiments have merely described the technical spirit and features of the present invention. The purpose is only for those skilled in the art to understand the content and implementation of the present invention, and the description herein is not intended to limit the scope of the present invention. Therefore, modifications and improvements according to the ideas disclosed in the present invention are still within the scope of the present invention.

What is claimed is:

1. A computer implemented distributed clustering-based multi-layer federated learning method comprising:

calculating feature distribution similarity of each of a plurality of non-independent and identically distributed (non-IID) data nodes, wherein calculating the feature distribution similarity includes substituting a distribution statistic value of original data;

grouping the non-IID data nodes into an aggregation model including a plurality of clusters based on the feature distribution similarity;

using the feature distribution similarity of each of the non-IID data nodes according to the calculation as a parameter and using a federated learning algorithm, thereby updating a local model of the non-IID data nodes in the aggregation model; and inputting the aggregation model into an aggregation method of a multi-layer model, wherein the aggregation method of the multi-layer model includes:

a. setting a number of layers of the aggregation model to i, and setting i to 1;

b. aggregating the clusters in an i-th layer and outputting a grouping result;

c. outputting the multi-layered model when the grouping result achieves model performance and stopping execution;

d. when the grouping result does not achieve the model performance, accumulating 1 in i, inputting the grouping result to the i-th layer, and executing step b again and when achieves the model performance, aggregates the clusters into a global cluster;

wherein the feature distribution similarity includes a feature quantity and a feature effect value of each of the non-IID data nodes;

wherein the feature quantity includes a feature quantity with significant differences between data, or a feature quantity with significant correlation within each data;

wherein the feature effect value includes a mean value, a standard deviation or a sample number.

2. The method of claim 1, wherein the non-IID data nodes are grouped into a plurality of clusters by using unsupervised learning, in which the unsupervised learning includes K-means, Expectation-Maximization Algorithm, Gaussian Mixture Model or Bayesian Gaussian Mixture Model.

3. The method of claim 1, wherein non-IID data nodes of each of the clusters have a similar feature distribution similarity.

4. The method of claim 1, wherein the federated learning algorithm is based on each of the clusters by unit, and updates local models of the non-IID data nodes of each of the clusters.

5. The method of claim 1, wherein the aggregation method of the multi-layer model is supported and implemented by a blockchain network technology, and the blockchain network technology has a structure including a model aggregation module, an API module, a timing synchronization module, and an interplanetary file system (IPFS).

6. A non-transitory computer readable medium comprising computer codes stored thereon, the computer codes when executed by one or more processors cause the one or more processors to perform a distributed clustering-based multi-layer federated learning method comprising steps of:

calculating feature distribution similarity of each of a plurality of non-independent and identically distributed (non-IID) data nodes, wherein calculating the feature distribution similarity includes substituting a distribution statistic value of original data;

grouping the non-IID data nodes into an aggregation model including a plurality of clusters based on the feature distribution similarity;

using the feature distribution similarity of each of the non-IID data nodes according to the calculation as a parameter and using a federated learning algorithm, thereby updating a local model of the non-IID data nodes in the aggregation model; and inputting the aggregation model into an aggregation method of a multi-layer model, wherein the aggregation method of the multi-layer model includes:

a. setting a number of layers of the aggregation model to i, and setting i to 1;

b. aggregating the clusters in an i-th layer and outputting a grouping result;

c. outputting the multi-layered model when the grouping result achieves model performance and stopping execution;

d. when the grouping result does not achieve the model performance, accumulating 1 in i, inputting the grouping result to the i-th layer, and executing step b again and when achieves the model performance, aggregates the clusters into a global cluster;

wherein the feature distribution similarity includes a feature quantity and a feature effect value of each of the non-IID data nodes;

wherein the feature quantity includes a feature quantity with significant differences between data, or a feature quantity with significant correlation within each data;

wherein the feature effect value includes a mean value, a standard deviation or a sample number.

7. The non-transitory computer readable medium of claim 6, wherein the non-IID data nodes are grouped into a plurality of clusters by using unsupervised learning, in which the unsupervised learning includes K-means, Expectation-Maximization Algorithm, Gaussian Mixture Model or Bayesian Gaussian Mixture Model.

8. The non-transitory computer readable medium of claim 6, wherein non-IID data nodes of each of the clusters have a similar feature distribution similarity.

9. The non-transitory computer readable medium of claim 6, wherein the federated learning algorithm is based on each of the clusters by unit, and updates local models of the non-IID data nodes of each of the clusters.

10. The non-transitory computer readable medium of claim 6, wherein the aggregation method of the multi-layer model is supported and implemented by a blockchain network technology, and the blockchain network technology has a structure including a model aggregation module, an API module, a timing synchronization module, and an interplanetary file system (IPFS).

\* \* \* \* \*